United States Patent
Booher et al.

(10) Patent No.: US 10,155,544 B2
(45) Date of Patent: Dec. 18, 2018

(54) SIDE RAIL WITH FLAT HOOK RETAINING FEATURE

(71) Applicant: East Manufacturing Corporation, Randolph, OH (US)

(72) Inventors: Howard D. Booher, Atwater, OH (US); Derek Davies, Louisville, OH (US)

(73) Assignee: EAST MANUFACTURING CORPORATION, Randolph, OH (US)

( * ) Notice: Subject to any disclaimer, the term of this patent is extended or adjusted under 35 U.S.C. 154(b) by 0 days.

(21) Appl. No.: 15/205,780

(22) Filed: Jul. 8, 2016

(65) Prior Publication Data

US 2017/0008581 A1 Jan. 12, 2017

Related U.S. Application Data

(60) Provisional application No. 62/190,060, filed on Jul. 8, 2015.

(51) Int. Cl.
*B62D 21/20* (2006.01)
*B60P 7/08* (2006.01)

(52) U.S. Cl.
CPC ............ *B62D 21/20* (2013.01); *B60P 7/0815* (2013.01)

(58) Field of Classification Search
CPC ......... B60D 1/06; B60P 7/0815; B62D 21/20; B62D 53/061; B62D 53/0828
USPC .................................................... 280/423.1
See application file for complete search history.

(56) References Cited

U.S. PATENT DOCUMENTS

| | | | |
|---|---|---|---|
| 5,860,777 A | 1/1999 | Walsh et al. | |
| 6,250,861 B1 * | 6/2001 | Whitehead | B60P 7/0815 410/100 |
| 7,677,625 B2 * | 3/2010 | Gosselin | B62D 21/14 280/785 |
| 8,393,838 B2 | 3/2013 | Plazek | |
| 2013/0257094 A1 * | 10/2013 | McCloud | B62D 25/2054 296/184.1 |

FOREIGN PATENT DOCUMENTS

CA  2 741 384  11/2011

* cited by examiner

*Primary Examiner* — Joseph M Rocca
*Assistant Examiner* — Felicia L. Brittman
(74) *Attorney, Agent, or Firm* — Fay Sharpe LLP (57) ABSTRACT

A semi-trailer includes first and second main beams and left and right side rails. A cargo platform extends between the left and right side rails. Each of the side rails includes an aluminum extrusion including an upper portion including a platform engaging portion, and a lower portion including a winch track. The lower portion further includes a projecting hook engagement wall. The hook engagement wall includes an upper surface oriented toward the cargo supporting platform and an opposite lower surface. The hook engagement wall includes a tapered nose including first and second nose walls that define a nose angle X such that said tapered nose is adapted to be received in an open recess of an associated cargo strap hook that defines a hook recess angle X'.

14 Claims, 10 Drawing Sheets

SIDE RAIL WITH FLAT HOOK RETAINING FEATURE

CROSS-REFERENCE TO RELATED APPLICATION

This application claims priority from and benefit of the filing date of U.S. provisional application Ser. No. 62/190,060 filed Jul. 8, 2015, and the entire disclosure of said provisional application is hereby expressly incorporated by reference into the present specification.

BACKGROUND

Figure 1A:
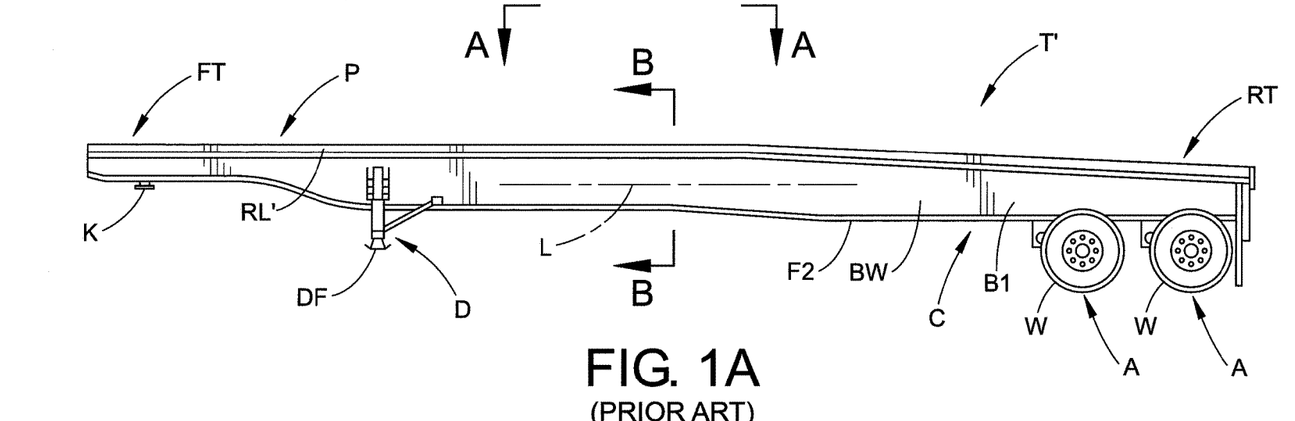
FIGS. 1A and 1B are left (driver side) and right (passenger side) elevation views, respectively, of a conventional semi-trailer (trailer) adapted to be connected to and pulled by a conventional tractor/truck (not shown)
Figure 1B:
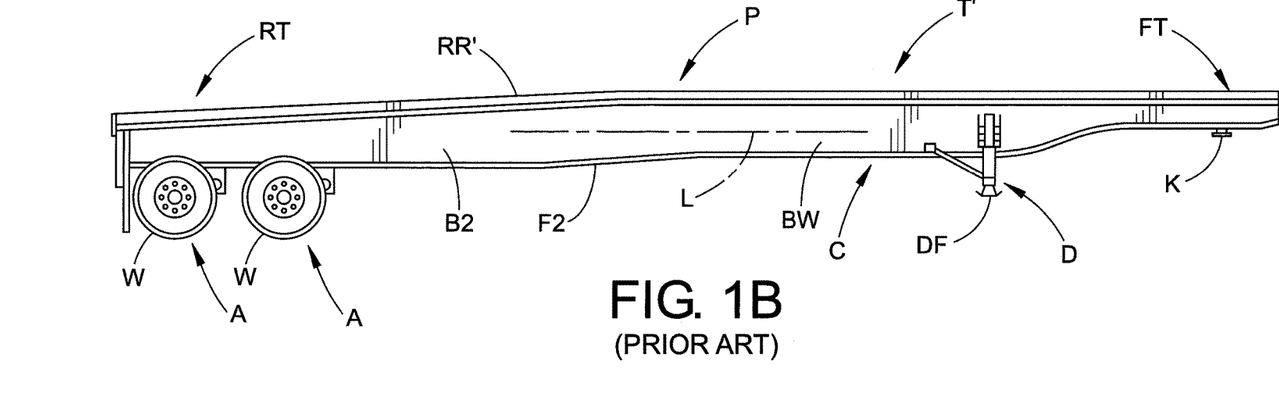
Figure 2A:
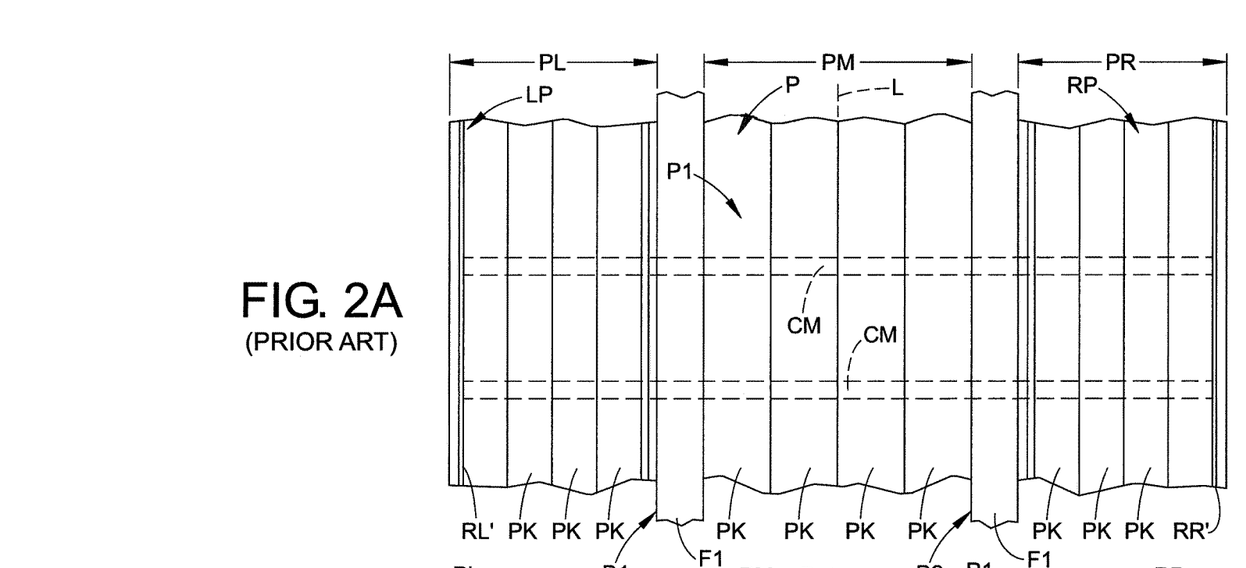
FIG. 2A is a partial plan view and FIG. 2B is a cross section view of the trailer T' as taken along view lines A-A and B-B of FIG. 1A, respectively.
Figure 2B:
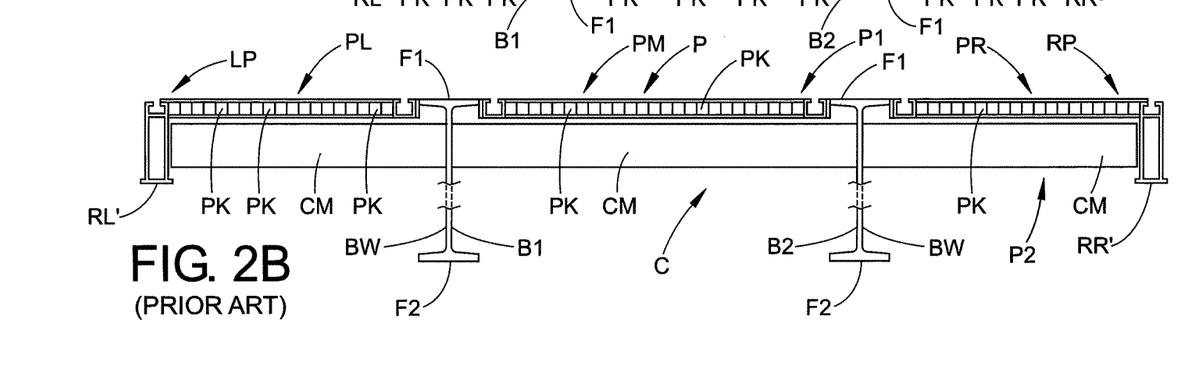

FIGS. 1A and 1B are left (driver side) and right (passenger side) elevation views, respectively, of a conventional semi-trailer T' adapted to be connected to and pulled by a conventional tractor/truck vehicle (not shown). The trailer comprises a forward end or forward region FT and a rear end or rear region RT spaced-apart from each other on a centrally located longitudinal axis L. FIG. 2A is a partial plan view and FIG. 2B is a cross section view of the trailer T as taken along view lines A-A and B-B of FIG. 1A, respectively.

The trailer T' comprises a cargo-supporting platform P including left and right laterally spaced-apart edges or sides LP,RP (see FIGS. 2A & 2B) that extend parallel to each other and parallel to the central longitudinal axis L on opposite lateral sides of the longitudinal axis. The platform P is supported by and connected to a chassis C that includes first (left) and second (right) spaced-apart main beams B1,B2 that extend parallel to each other and parallel to the longitudinal axis L on opposite sides of the longitudinal axis from the forward end FT to the rear end RT. Each beam B1,B2 typically defines an I-beam section or profile comprising an upper transverse flange F1 and a lower transverse flange F2 (FIG. 2B) connected by a vertical web BW. The beams can be steel or aluminum and are often fabricated by welding or otherwise abutting and welding together or otherwise connecting two separate T-shaped aluminum extrusions.

A kingpin K is located at the forward end FT of the trailer T', centrally located between and connected to the beams B1,B2, and is adapted to be engaged by a fifth-wheel of an associated tractor/truck vehicle for towing the trailer T'. The rear end RT of the trailer includes at least one and typically at least two axle assemblies A connected to the chassis, e.g., to the lower flanges F2 of beams B1,B2. Each axle assembly A comprises at least one left and at least one right rotatable wheel and tire assemblies W for movably supporting the trailer T' on a road or other surface. The trailer 7 further comprises a dolly assembly D, typically located axially between the kingpin K and an axial midpoint of the trailer T'. The dolly assembly D includes support feet DF that are selectively lowered to support the forward end FT of the trailer T' when the kingpin is not connected to an associated tractor/truck (the dolly assembly D is omitted from the background of FIG. 2B for clarity).

The platform P comprises left and right side rails RL',RR' that delimit and define the opposite left and right lateral sides LP,RP of the platform P (and the overall trailer T'), respectively. These side rails RL',RR' are each typically defined as one-piece or monolithic extrusions of aluminum alloy such as 6061-T6 or 6005A-T6 or similar (often referred to herein simply as "aluminum") having a profile such as that shown in FIG. 2B and that extend in one piece from the forward end FT to the rear end RT of the trailer T' along the longitudinal axis L (the profiles of the side rails RL',RR' are typically mirror images of each other as shown herein). The side rails RL',RR' are often arched as shown in FIGS. 1A and 1B with an apex of the arch oriented upward and located between the forward and rear ends FT,RT.

The platform P, itself, comprises left, middle and right sections PL,PM,PR that each comprise one or more wood and/or metal longitudinally extending platform members PK, each of which extends longitudinally from the forward end FT to the rear end RT of the trailer T', to define an upper cargo-supporting surface P1 of the platform P. Typically, the platform members PK each comprise a one-piece aluminum extrusion and/or a wooden plank or the like. In the illustrated embodiment, the platform members PK extend longitudinally between the forward and rear trailer ends FT,RT, but each platform member PK can alternatively extend transversely between and interconnect the left and right side rails RL',RR'. In the illustrated trailer embodiment, the upper flange F1 of each beam B1,B2 also defines part of the platform surface P1, with the upper flange F1 of the first (left) beam B1 connected to both of the left and middle platform sections PL,PM and the upper flange F1 of the second (right) beam B2 connected to both of the right and middle platform sections PR,PM.

In the illustrated embodiment, to support the longitudinally extending platform members PK, the platform P of trailer T' further comprises a plurality of transversely extending cross members CM located beneath the platform members PK at axially spaced intervals along the entire length of the trailer T'. The cross members CM are welded or otherwise connected to and extend between the left and right side rails RL,RR, passing through and typically welded to the beams B1,B2. In some cases the cross members CM comprise three separate "stub" cross member sections located respectively beneath and supporting the left, middle and right platform sections PL,PM,PR instead of a single cross member that passes through the beams B1,B2. These cross members CM can have a variety of shapes, e.g., I-beam, U-shaped, C-shaped, etc. and be defined from a variety of materials such as steel or aluminum, e.g., aluminum extrusions.

Figures 3A, 3B, 3C:
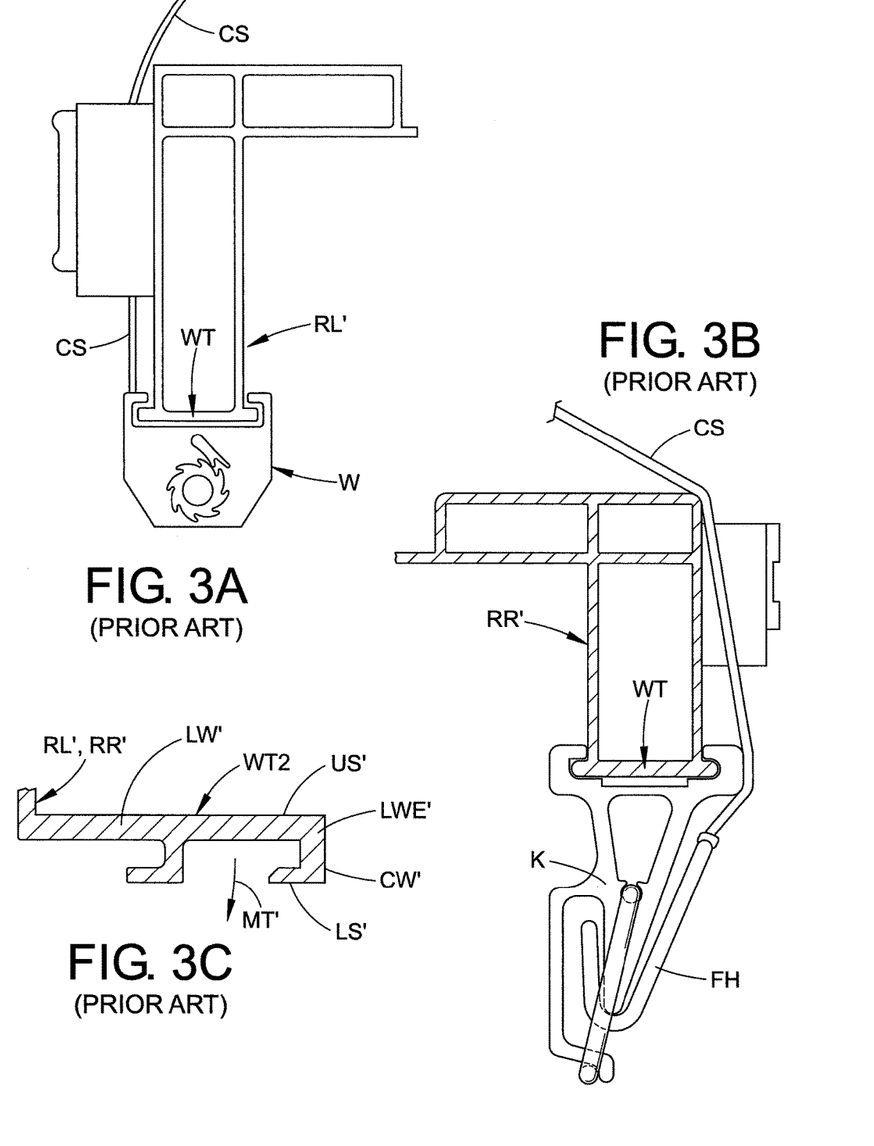
FIG. 3A illustrates a conventional side rail extrusion profile and a known cargo strap winch slidably connected thereto.
FIG. 3B shows another conventional side rail extrusion profile and a known flat hook retaining bracket slidably connected thereto.
FIG. 3C illustrates another conventional side rail extrusion profile including an integral "double L" (LL) style winch track for being slidably engaged by corresponding LL-style cargo strap winches.

As shown in FIG. 3A, it is generally known in the art that the left and right side rails RL',RR' (only the left side rail RL is shown in FIG. 3A) are defined to include and/or have connected thereto a winch track WT adapted to be slidably engaged by an associated cargo strap winch W that contains a spooled length of a cargo strap CS for securing a load on the platform P. FIG. 3B shows an example of a right side rail RR' having a similar structure as the left side rail RL' including a winch track WT, but FIG. 3B shows that an associated flat hook retaining bracket K can additionally or alternatively be slidably engaged with the winch track WT. The flat hook retaining bracket K is adapted to receive and retain a flat hook (see flat hook FH in FIG. 7B) or other hook located at the distal end of a cargo strap CS.

The left and right side rails RL',RR' can alternatively be defined with or include a "double L" (LL) winch track WT2 as shown in FIG. 3C so that corresponding LL-style winches W and flat hook retaining brackets K can be slidably mated therewith. Each such side rail RL',RR' comprises a horizontal projecting lower wall LW' comprising an outer end or tip LWE'. The outer end LWE' is formed with a generally rectangular structure as defined between the parallel upper and lower parallel US',LS' and a connecting wall CW' that can be straight or slightly curved. Those of ordinary skill in the art will recognize that while a flat hook FH (FIG. 7B) or other hook can be engaged with the outer end LWE' of the wall LW', the outer end LWE' would be loosely received in the flat hook recess HR and the flat hook FH would easily become detached from the outer end LWE' when the cargo strap CS on which the flat hook is located is untensioned. Also, the flat hook FH would be free to pivot about the outer end LWE' to a position where an undesirable bending moment MT' exerted on the wall LW' is increased.

A need has been identified for a new and improved trailer side rail structure that provides a superior structure and system for retaining a flat hook FH or other hook of a cargo strap CS, without requiring a separate bracket K to be affixed to the side rail and that protect the winch track WT1,WT2 of the side rail.

SUMMARY

In accordance with one aspect of the present development, a trailer includes first and second main beams that extend parallel to a longitudinal axis. A left side rail extends parallel to the longitudinal axis and defines a left lateral side of the trailer, and a right side rail extends parallel to the longitudinal axis and defines a right lateral side of the trailer. A cargo platform extends between the left side rail and right side rails. A kingpin is located at a forward end of the trailer and is adapted to be engaged by a fifth-wheel of an associated truck for towing the trailer T. An axle assembly is located at a rear end of the trailer and is connected to the first and second main beams, said axle assembly comprising at least one left and at least one right rotatable wheel and tire assembly for movably supporting the trailer on a surface. Each of the left and right side rails comprises a one-piece aluminum extrusion comprising an upper portion including a platform engaging portion engaged with the cargo platform, and a lower portion comprising a winch track adapted to be slidably engaged by an associated cargo strap winch. The lower portion further includes a hook engagement wall that projects away from the side rail toward the first and second main beams of the trailer. The hook engagement wall comprises an upper surface oriented toward the cargo supporting platform and an opposite lower surface oriented away from the cargo supporting platform. The hook engagement wall comprises a tapered nose including first and second nose walls that define a nose angle X such that said tapered nose is adapted to be received in an open recess of the associated cargo strap hook that defines a hook recess angle X'.

DETAILED DESCRIPTION

Figure 4A:
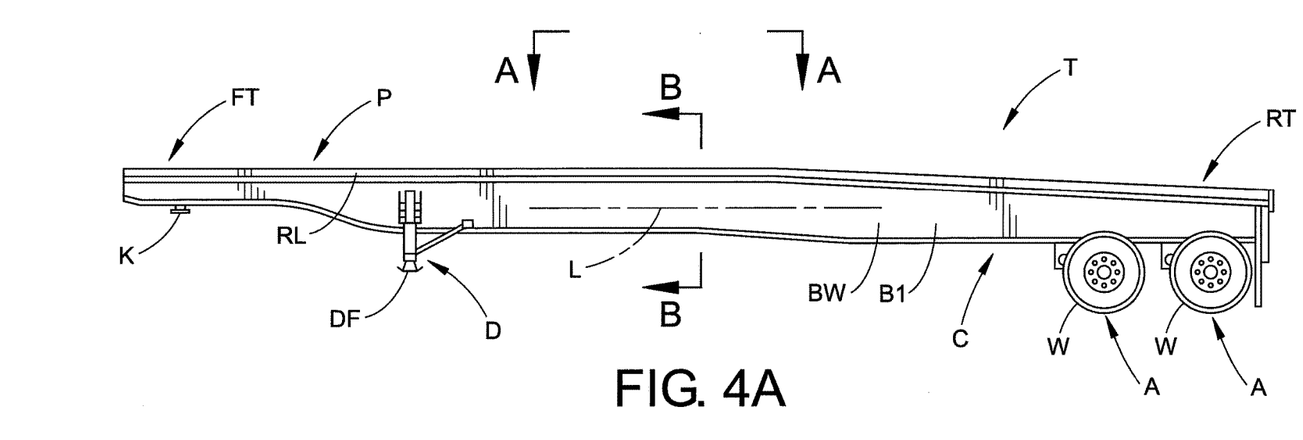
FIGS. 4A and 4B are left (driver side) and right (passenger side) elevation views, respectively, of a semi-trailer (trailer) formed in accordance with the present invention.
Figure 4B:
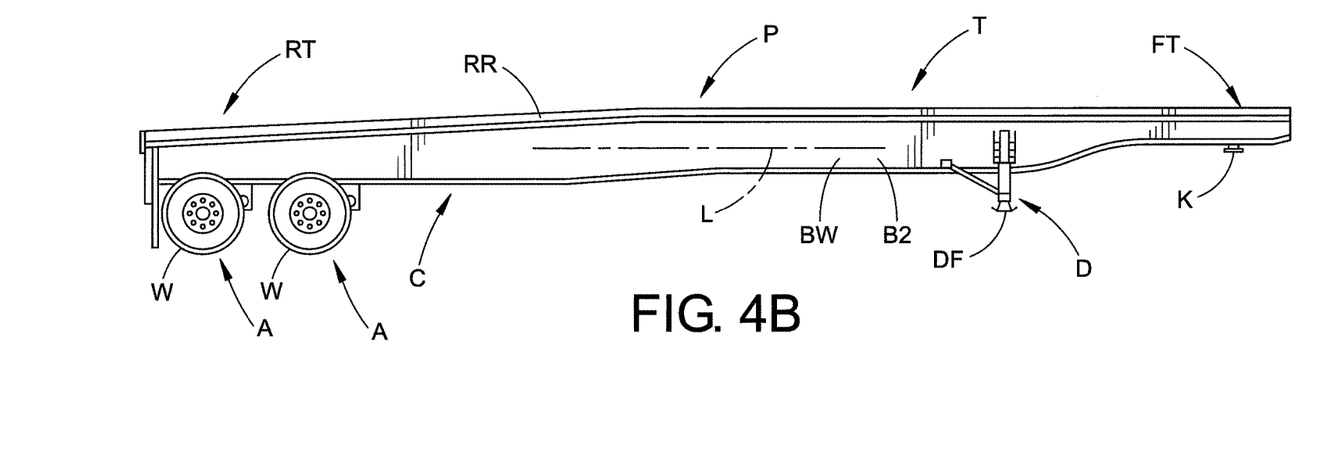

FIGS. 4A and 4B are left (driver side) and right (passenger side) elevation views, respectively, of a semi-trailer T formed in accordance with the present invention and adapted to be connected to and pulled by a conventional tractor/truck (not shown). Except as otherwise shown and/or described herein, the trailer T is identical to the prior art trailer T' and, as such, like components of the trailer T relative to the known trailer T are identified using the same reference characters used in the description of the trailer T', in some cases without repeating the above descriptions. The trailer T differs from the trailer T' in that the trailer T includes new and improved left and right side rails RL,RR as compared to the left and right side rails RL',RR' of the trailer T'.

Figure 5A:
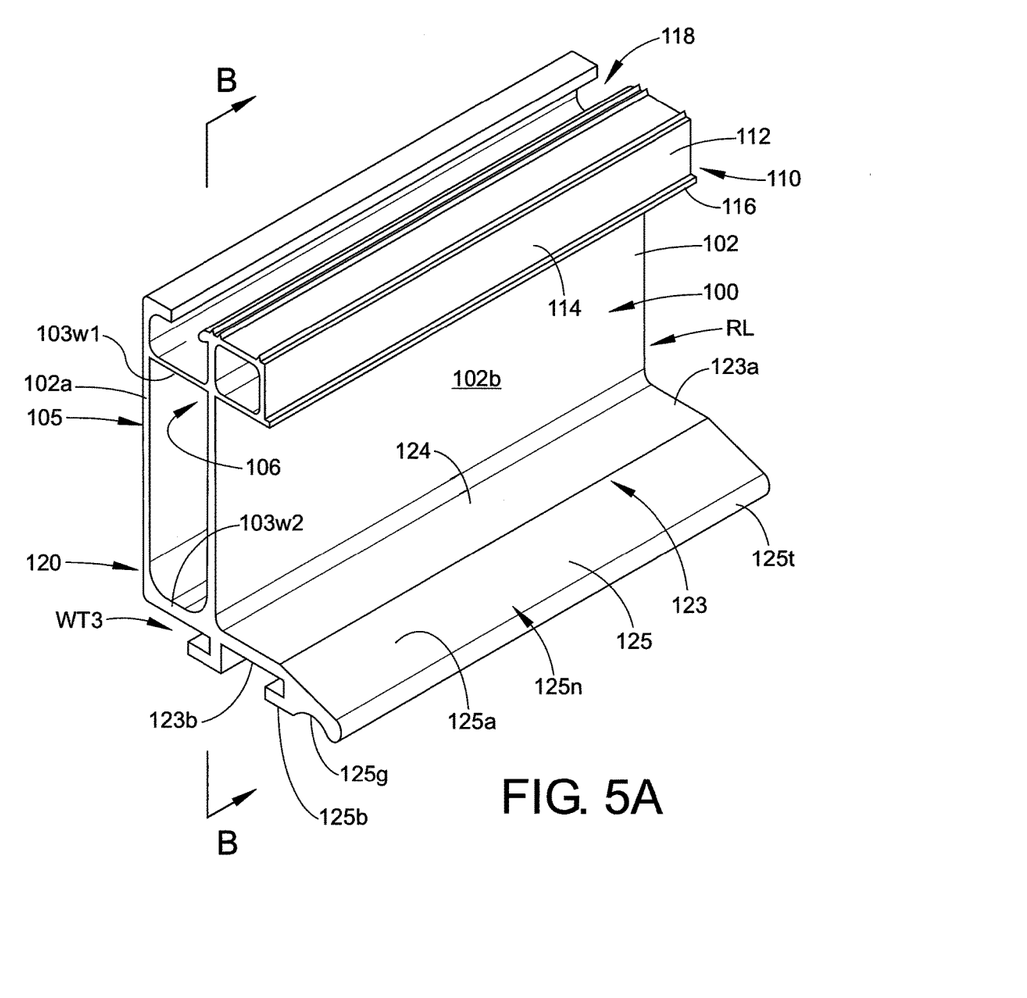
FIG. 5A is an isometric view of a portion of the left side rail of the trailer of FIGS. 4A and 4B.
Figure 5B:
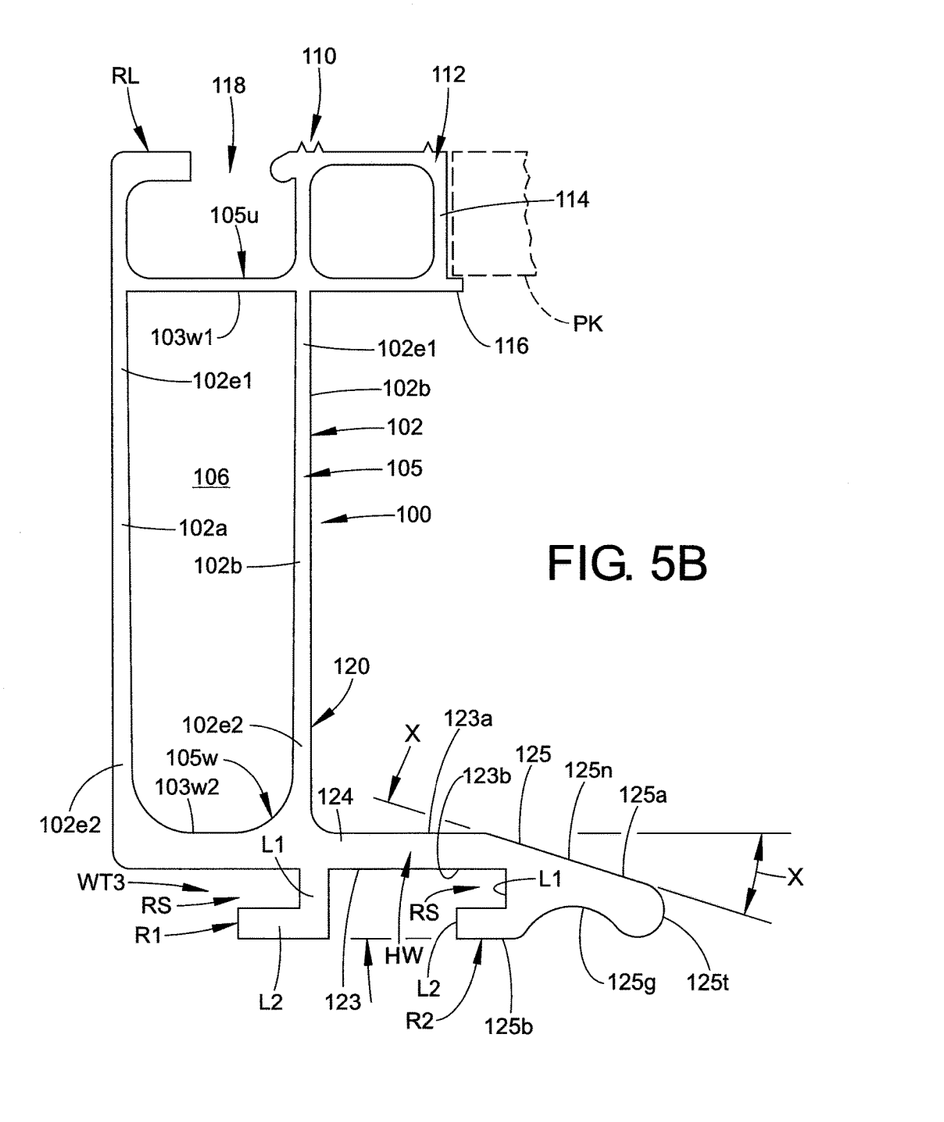
FIG. 5B is an end or profile view of the left side rail taken at line B-B of FIG. 5A.
Figure 6A:
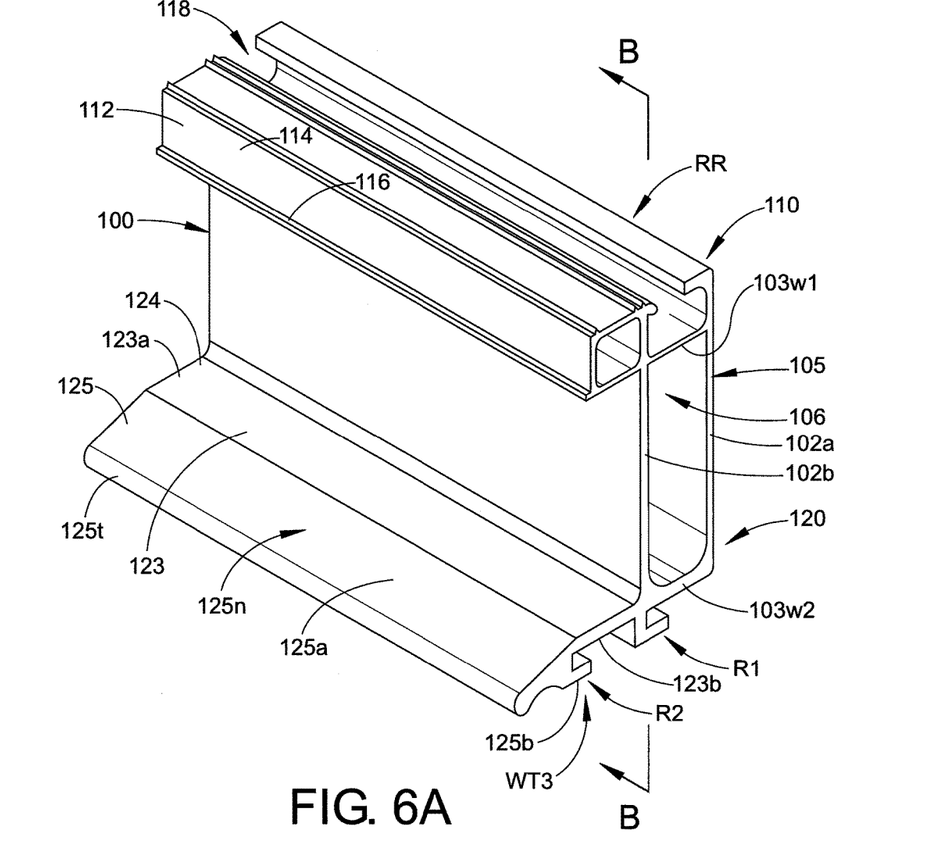
FIG. 6A is an isometric view of a portion of the right side rail of the trailer of FIGS. 4A and 4B.
Figure 6B:
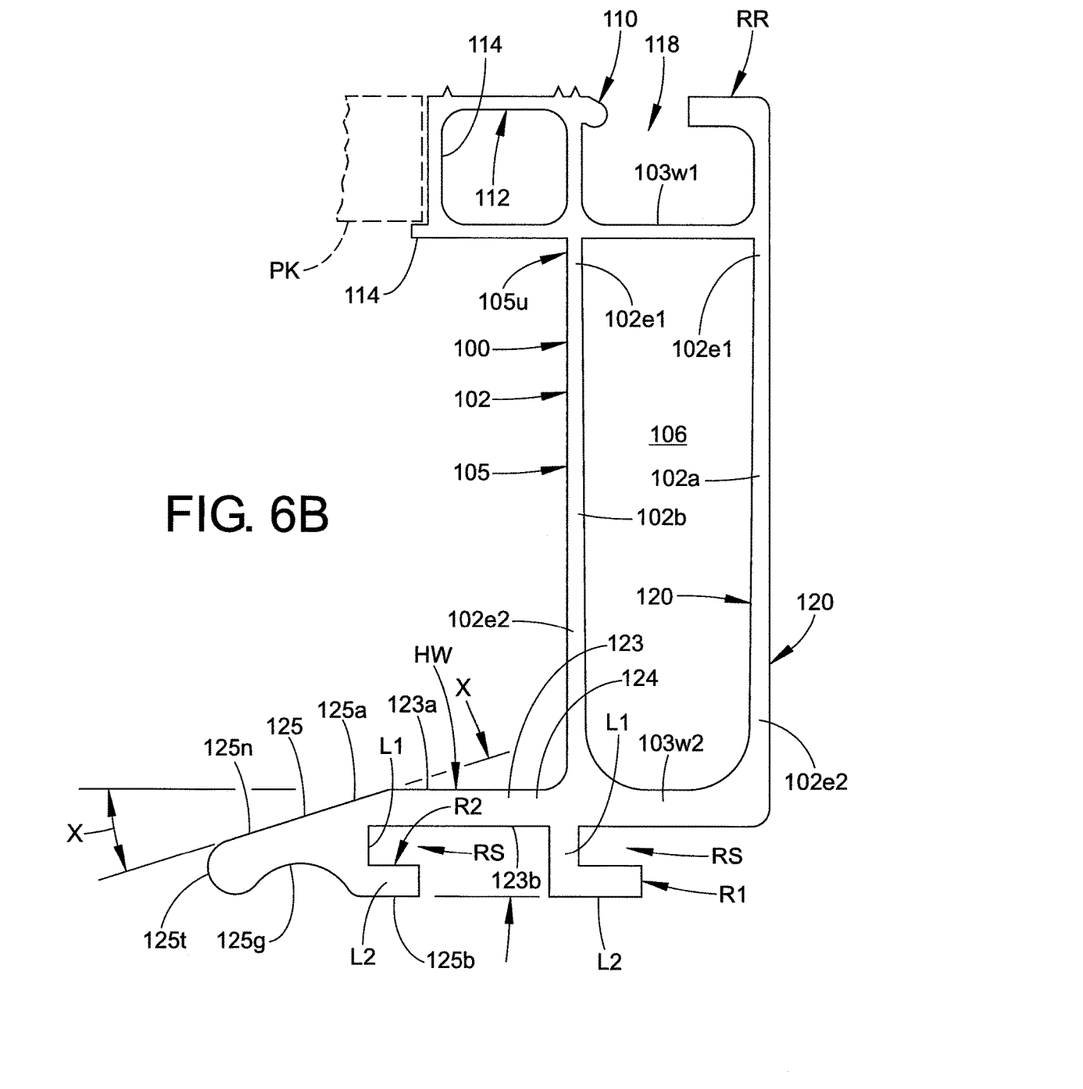
FIG. 6B is an end or profile view of the left side rail taken at line B-B of FIG. 6A.

FIG. 5A is an isometric view of the left side rail RL and FIG. 5B is an end or profile view of the left side rail RL taken at line B-B of FIG. 5A, and also shows an associated cargo strap CS with a flat hook FH on its distal end engaged with the side rail RL. Similarly, FIG. 6A is an isometric view of the right side rail RR and FIG. 6B is an end or profile view of the right side rail RR taken at line B-B of FIG. 6A. The left and right side rails RL,RR are identically structured relative to each other, but are arranged in an opposite "mirror image" orientation relative to each other on opposite lateral sides of the trailer. Those of ordinary skill in the art will recognize that FIGS. 5B and 6B define the extrusion profile used for both the left and right side rails RL,RR. The left and right side rails delimit and define the opposite left and right lateral sides LP,RP of the platform P (and the overall trailer T), respectively.

The left and right side rails RL,RR are each defined from one-piece monolithic aluminum alloy extrusions using any suitable aluminum alloy (referred to herein simply as "aluminum") known in the trailer manufacturing arts, such as 6061-T6 or 6005A-T6 aluminum alloy or similar. Each side rail RL,RR comprises a main body 100 comprising one or more axially extending, vertically oriented (when the trailer T is in use) main walls 102 each including a first edge 102e1 and a second edge 102e2 located vertically below the first edge 102e1. As shown, the main body 100 comprises a first or outer main wall 102a and a second or inner main wall 102b, and the first and second main walls 102a, 102b are arranged to be vertically oriented, parallel and spaced-apart relative to each other. The first (upper) edges 102e1 of the first and second walls 102a, 102b are connected by a first or upper connecting wall 103w1 and the second (lower) edges 102e2 are connected by a lower connecting wall 103w2 such that a box structure 105 including a hollow core or space 106 is defined by first and second main walls 102a, 102b and the upper and lower connecting walls 103w1, 103w2. The box structure 105 includes an upper portion 105u comprising the first/upper connecting wall 103w1 and the upper edges 102e1 of the main walls 102a, 102b. The box structure 105 also includes a lower portion 105w comprising the second/lower connecting wall 103w2 and the lower edges 102e2 of the main walls 102a, 102b.

Each side rail RL,RR comprises an upper portion 110 located at a first or upper end of the main body 100 adjacent and connected to the upper portion 105u of the box structure 105. The side rail upper portion 110 comprises a platform engaging portion 112 adapted to engage and be connected by welding or otherwise to one or more platform members PK (partially shown in broken lines in FIGS. 5B and 6B) of the trailer cargo-supporting platform P. In the illustrated embodiment, the platform engaging portion 112 comprises a vertical wall 114 that is abutted by a platform member PK, and a transverse projecting lip or flange 116 extends outwardly from the wall 114 and supports the platform member (or members) PK that is (are) abutted with the wall 114. The platform member PK is welded, fastened, and/or otherwise fixedly secured to the platform engaging portion 112. The upper portion 110 further comprises an open channel 118 that opens upwardly and that is adapted for receiving and retaining an associate cargo retaining device such as a chain plate or the like. The upper portion 110 of the side rail defines part of the cargo supporting platform P when the platform member PK is operably connected thereto.

Each side rail RL,RR also comprises a lower portion 120 located at a second or lower end of the main body 100 adjacent and connected to the lower portion 105w of the box structure 105. The lower region 120 comprises a double-L (LL) or otherwise shaped winch track WT3 adapted to be slidably engaged by a conventional associated cargo strap winch having a corresponding structure for slidably mating with the LL winch track WT3 or other winch track structure. More particularly, the lower region 120 comprises a transversely projecting hook engagement wall 123 that is connected to the lower portion 105w of the box structure 105 and that projects inwardly away from the box structure 105 (inwardly away from the second main wall 102b of the box structure 105 in the illustrated embodiment) toward the center of the trailer, i.e., toward the first and second main beams B1,B2. In the illustrated embodiment, the hook engagement wall 123 is connected to the second main wall 102b and also comprises an extension of the lower connecting wall 103w2 that is cantilevered with respect to the second main wall 102b of the box structure 105. In the illustrates embodiment, the lower connecting wall 103w2 and projecting hook engagement wall 123 together define a base wall HW including a first portion that comprises the lower connecting wall 103w2 and a second portion that comprises the hook engagement wall 123.

The hook engagement wall 123 is arranged transversely relative to the second/inner main wall 102b of the box structure 105 and extends perpendicular relative to the box structure 105 (relative to the first and second vertical main walls 102a, 102b of the box structure 105) and relative to the webs BW of the trailer beams B1,B2. As such, the hook engagement wall 123 comprises a first or upper surface 123a oriented upward or toward the cargo supporting platform P, and further comprises an opposite second or lower surface 123b that is oriented downward or away from the cargo supporting surface P toward the road or other support surface on which the wheel/tire assemblies W are supported when the trailer T is in use.

The winch track WT3 is connected to the base wall HW (the lower connecting wall 103w2 and/or the cantilevered hook engagement wall 123). The winch track WT3 comprises first (outer) and second (inner) L-shaped projections or ribs R1,R2 that project outwardly or downwardly from the base wall HW. In the illustrated embodiment, the first rib R1 is connected to the base wall HW adjacent the intersection of the vertical second main wall 102b with the base wall HW, and the second rib R2 is connected to the second portion of the base wall HW comprising the hook engagement wall 123. Each of the L-shaped ribs R1,R2 of the winch track WT3 includes a first wall or leg L1 that extends perpendicularly away from the base wall HW and each of the L-shaped ribs R1,R2 further includes a second wall or leg L2 that is connected to an outer end of the first leg L1 and that extends perpendicularly away from the first leg L1 in an outward direction away from the trailer beams B1,B2 and parallel to the base wall HW. As such, each L-shaped rib R1,R2 defines a space RS between the second leg L2 and the portion of the base wall BW to which the first leg L1 is connected. This space RS is adapted for slidably receiving the mating structure of the associated cargo strap winch.

Figure 7A:
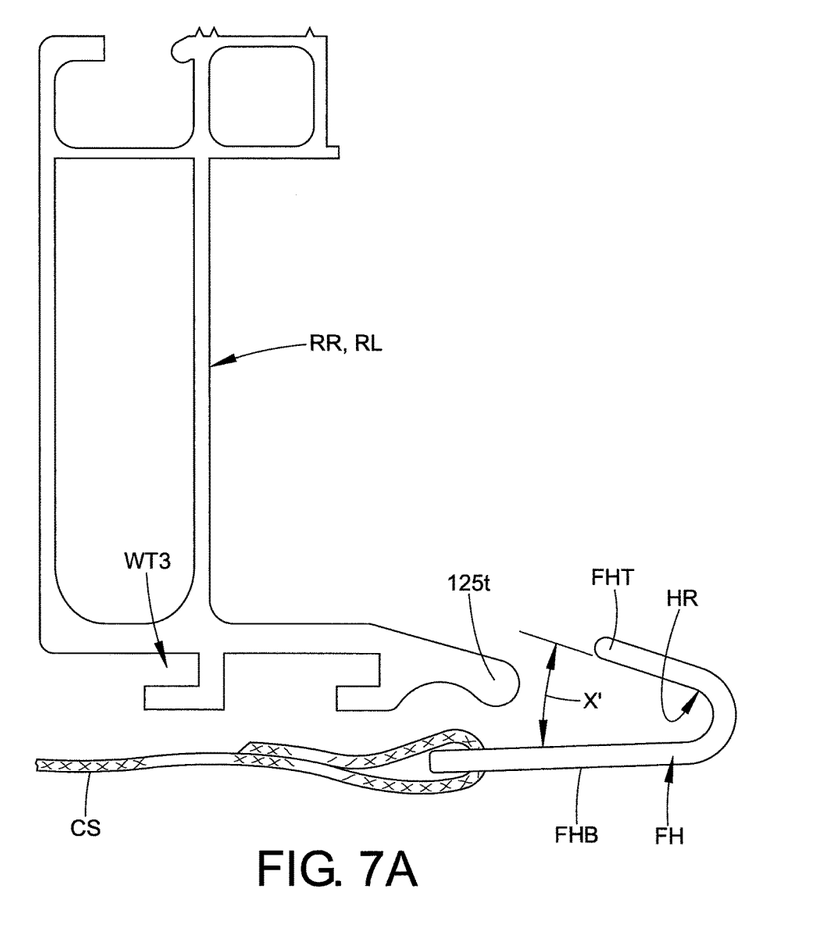
FIG. 7A shows the side rail of FIGS. 5A and 5B and also shows an associated cargo strap with a flat hook on its distal end, with the flat hook disengaged from the side rail.

The cantilevered hook engagement wall 123 includes a first or inner end 124 connected to the box structure 105 or other portion of the main body 100 and includes a second or outer end 125 that is spaced away from the inner end 124 and that is specifically structured to be engaged by a flat hook located at the end of a cargo strap. FIG. 7A illustrates a typical cargo strap CS including a flat hook FH located at an end thereof. The cargo strap CS is typically defined from a woven fabric or web or similar material and the flat hook FH is defined as a one-piece construction from steel or aluminum or another metal and is secured to an end of the cargo strap CS. The flat hook FH comprises a straight or flat base FHB connected to the strap CS, and comprises a straight or flat tip FHT connected to the base FHB and turned-back upon the base to define a hook structure comprising a hook recess HR located between the base FHB and the tip FHT. The hook recess HR defines a hook recess angle X' between the base FHB and the tip FHT of the flat hook FH, which is typically in the range of 10°-30°.

Figure 7B:
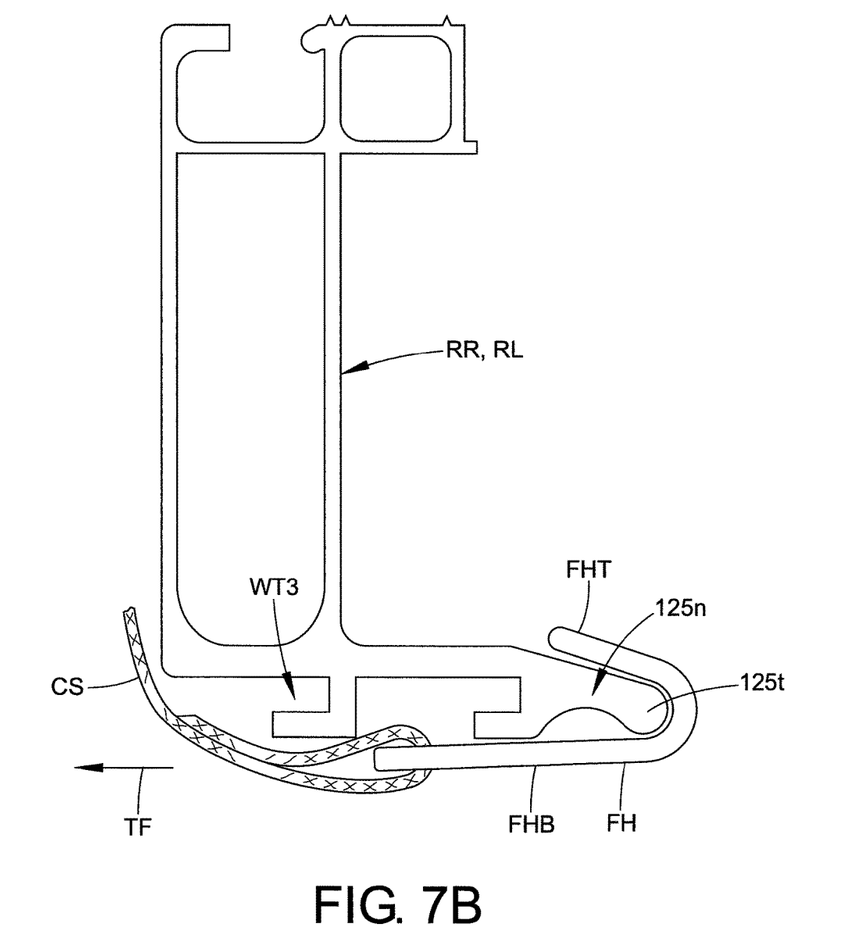
FIG. 7B is identical to FIG. 7A except that it shows the flat hook operably engaged with the side rail to secure a load on the cargo platform of the trailer.

The outer end 125 of the hook engagement wall 123 of the left and right side rails RL,RR is structured to be closely received in the hook recess HR of a flat hook FH or other similar hook. As such, the outer end 125 of the hook engagement wall 123 comprises a tapered nose 125n defined by first and second nose surfaces or nose walls 125a, 125b that are oriented relative to each other such that they converge toward each other as they extend away from the inner end 124 of the hook engagement wall 123 toward the first and second main beams B1,B2 of the trailer T. The first nose wall 125a is connected to the upper surface 123a of the hook engagement wall 123. Preferably, at least part of each nose wall 125a, 125b is planar. In the illustrated embodiment, at least part of the second nose wall 125b is defined by an outer surface of the second leg L2 of the second rib R2 of the winch track WT3. The nose 125n includes a radiused or otherwise rounded tip 125t that is shaped to conform to and be closely received into the internal space or hook recess HR defined between the base FHB and the tip FHT of the associated flat hook or other cargo strap retaining hook FH as shown in FIG. 7B (some space is shown between the nose 125n and the hook FH to clarify the drawing).

More specifically, the first and second nose walls 125a, 125b are arranged to converge toward each other at a corresponding nose angle X (see FIG. 6B), where the nose angle X is at least approximately equal to the hook recess angle X' or most preferably where X=X', and the nose 125n is otherwise shaped and dimensioned to fit closely within the recess HR of the hook FH such that a minimum clearance is defined between the first and second tapered walls 125a, 125b and the tip FHT and base FHB of the flat hook FH, respectively. In the case where either of the first and second nose walls 125a, 125b is non-planar, the nose angle X can measured by using a reference plane tangent to the non-planar surface 125a, 125b. Alternatively, the nose angle X can measured between the upper surface 123a of the hook engagement wall 123 and the first nose wall 125a (or reference planes tangent to these surfaces if they are not planar), and the tapered nose 125n is thus defined by the magnitude of the angle X at which the first nose wall 125a deviates from the upper surface 123a of the hook engagement wall 123 and converges toward the lower wall 123b of the hook engagement wall. In one embodiment, both X and X' are in the range of 10° to 30°, e.g., X=X'=16°. As shown in FIG. 7B, this disclosed structure of the nose 125n ensures that the flat hook FH is fully engaged with the nose 125n with minimal clearance or "play" and ensures that the flat hook FH will not separate from the nose 125n when the cargo strap CS is "loose" or untensioned as could occur if the nose 125n was not shaped as disclosed herein. The congruence between the nose angle X and the hook recess angle X' and the other structure of the nose 125 as described herein ensures that the tapered walls 125a, 125b of the nose 125n abut the flat hook tip FHT and flat hook base FHB, respectively, when the flat hook FH is fully operably engaged in the nose 125n to prevent or minimize pivoting movement of the flat hook FH about the nose 125n on an arc when the cargo strap CS is untensioned or loose which pivoting movement could lead to dislodgement of the flat hook FH from the nose 125n. The close abutment of the flat hook tip FHT and base FHB with the nose walls 125a, 125b increases the frictional engagement between the abutted surfaces 125a,FHT and 125b,FHB to further inhibit undesired dislodgement of the flat hook FH when the cargo strap CS is untensioned. Also, the illustrated close mating abutment of the nose 125n in the flat hook recess HR is believed to reduce a bending moment exerted on the nose 125n by the flat hook FH that could be increased in magnitude if the nose 125n is only partially and/or loosely received in the flat hook recess HR. Similarly, it is preferred that the nose 125n be conformed and dimensioned such that the base FHB of the flat hook FH be oriented perpendicular to the first and second main walls 102a, 102b of the box structure 105 to reduce the bending moment exerted on the hook engagement wall 123 by the flat hook FH when the cargo strap CS is tensioned such that the tensioning load or force TF exerted by the strap CS and flat hook FH on the hook engagement wall 123 is oriented normal to the second main wall 102b of the box structure 105. Also, the nose 125n of the illustrated embodiment includes an optional axially extending relief groove 125g that reduces weight and that provides a void or space in which a chain link, enlarged section of the strap CS or other part of the flat hook FH or strap CS is received in case the particular strap and flat hook FH engaged with the nose 125n has any projecting portion that would prevent the nose 125n from being fully received in the flat hook recess HR in the absence of the groove 125g. In an alternative embodiment, the groove 125g is omitted.

The invention has been described with reference to preferred embodiments. Modifications and alterations will occur to those of ordinary skill in the art to which the invention pertains, and it is intended that the claims be construed as broadly as possible to encompass all such modifications and alterations while preserving the validity of the claims.

The invention claimed is:

1. A trailer comprising:
first and second main beams that extend parallel to a longitudinal axis;
a left side rail that extends parallel to said longitudinal axis and that defines a left lateral side of said trailer;
a right side rail that extends parallel to said longitudinal axis and that defines a right lateral side of said trailer;
a cargo platform that extends between said left side rail and said right side rail;
a kingpin located at a forward end of the trailer and adapted to be engaged by a fifth-wheel of an associated tractor or other vehicle for towing the trailer;
an axle assembly located at a rear end of the trailer and connected to the first and second main beams, said axle assembly comprising at least one left rotatable wheel and tire assembly and at least one right rotatable wheel and tire assembly for movably supporting the trailer on a surface;
wherein each of said left and right side rails comprise a one-piece aluminum extrusion comprising:
an upper portion including a platform engaging portion engaged with the cargo platform;
a lower portion comprising a winch track adapted to be slidably engaged by an associated cargo strap winch, wherein said winch track comprises a double L winch track including first and second ribs each comprising a first leg and a second leg connected to and arranged perpendicular to said first leg, wherein said second leg extends from said first leg in a direction oriented away from said first and second main beams of said trailer;
said lower portion further comprising a hook engagement wall that projects away from the side rail toward the first and second main beams of the trailer, said hook engagement wall comprising an upper surface oriented toward the cargo supporting platform and an opposite lower surface oriented away from the cargo supporting platform;
said hook engagement wall including a tapered nose comprising first and second nose walls that define a nose angle X such that said tapered nose is adapted to be received in an open recess of an associated cargo strap hook that defines a hook recess angle X', wherein said second nose wall of said tapered nose is at least partially defined by said second leg of said second rib of said winch track.

2. A trailer comprising:
first and second main beams that extend parallel to a longitudinal axis;
a left side rail that extends parallel to said longitudinal axis and that defines a left lateral side of said trailer;
a right side rail that extends parallel to said longitudinal axis and that defines a right lateral side of said trailer;
a cargo platform that extends between said left side rail and said right side rail;
a kingpin located at a forward end of the trailer and adapted to be engaged by a fifth-wheel of an associated tractor or other vehicle for towing the trailer;
an axle assembly located at a rear end of the trailer and connected to the first and second main beams, said axle assembly comprising at least one left rotatable wheel and tire assembly and at least one right rotatable wheel and tire assembly for movably supporting the trailer on a surface;
wherein each of said left and right side rails comprise a one-piece aluminum extrusion comprising:

an upper portion including a platform engaging portion engaged with the cargo platform;

a lower portion comprising a winch track adapted to be slidably engaged by an associated cargo strap winch;

said lower portion further comprising a hook engagement wall that projects away from the side rail toward the first and second main beams of the trailer, said hook engagement wall comprising an upper surface oriented toward the cargo supporting platform and an opposite lower surface oriented away from the cargo supporting platform;

said hook engagement wall including a tapered nose comprising first and second nose walls that define a nose angle X such that said tapered nose is adapted to be received in an open recess of an associated cargo strap hook that defines a hook recess angle X';

wherein said aluminum extrusion of each of said left and right side rails further comprises a box structure including first and second parallel, spaced-apart main walls connected by an upper connecting wall and a lower connecting wall, wherein said hook engagement wall comprises an extension of said lower connecting wall that is oriented perpendicularly relative to said second main wall of said box structure.

3. The trailer as set forth in claim 2, wherein said hook engagement wall is cantilevered relative to said box structure.

4. The trailer as set forth in claim 2, wherein said upper surface and said lower surface of said hook engagement wall are each arranged perpendicularly relative to said second main wall of said box structure, and wherein the first nose wall is arranged to converge toward said lower surface at said nose angle X so as to define said tapered nose.

5. The trailer as set forth in claim 4, wherein said nose angle X is in the range of 10°-30° such that 10°≤X≤30°.

6. The trailer as set forth in claim 5, wherein said winch track comprises a double-L winch track comprising first and second ribs, wherein each of said first and second ribs comprises a first leg and a second leg connected to an outer end of said first leg and oriented perpendicularly relative to said first leg.

7. A trailer comprising:
first and second main beams that extend parallel to a longitudinal axis;
a left side rail that extends parallel to said longitudinal axis and that defines a left lateral side of said trailer;
a right side rail that extends parallel to said longitudinal axis and that defines a right lateral side of said trailer;
a cargo platform that extends between said left side rail and said right side rail;
a kingpin located at a forward end of the trailer and adapted to be engaged by a fifth-wheel of an associated tractor or other vehicle for towing the trailer;
an axle assembly located at a rear end of the trailer and connected to the first and second main beams, said axle assembly comprising at least one left rotatable wheel and tire assembly and at least one right rotatable wheel and tire assembly for movably supporting the trailer on a surface;
wherein each of said left and right side rails comprise a one-piece aluminum extrusion comprising:
an upper portion including a platform engaging portion engaged with the cargo platform;
a lower portion comprising a winch track adapted to be slidably engaged by an associated cargo strap winch, wherein said winch track comprises a double L winch track including first and second ribs each comprising a first leg and a second leg connected to and arranged perpendicular to said first leg, wherein said second leg extends from said first leg in a direction oriented away from said first and second main beams of said trailer;
said lower portion further comprising a hook engagement wall that projects away from the side rail toward the first and second main beams of the trailer, said hook engagement wall comprising an upper surface oriented toward the cargo supporting platform and an opposite lower surface oriented away from the cargo supporting platform;
said hook engagement wall including a tapered nose comprising first and second nose walls that define a nose angle X such that said tapered nose is adapted to be received in an open recess of an associated cargo strap hook that defines a hook recess angle X';
wherein said aluminum extrusion of each of said left and right side rails further comprises a box structure including first and second parallel, spaced-apart main walls connected by an upper connecting wall and a lower connecting wall, wherein said hook engagement wall comprises an extension of said lower connecting wall that is oriented perpendicularly relative to said second main wall of said box structure.

8. The trailer as set forth in claim 7, wherein said lower connecting wall and said hook engagement wall together define a base wall, and wherein both said first and second ribs of said winch track are connected to said base wall.

9. A trailer comprising:
first and second main beams that extend parallel to a longitudinal axis;
a left side rail that extends parallel to said longitudinal axis and that defines a left lateral side of said trailer;
a right side rail that extends parallel to said longitudinal axis and that defines a right lateral side of said trailer;
a cargo platform that extends between said left side rail and said right side rail;
a kingpin located at a forward end of the trailer and adapted to be engaged by a fifth-wheel of an associated tractor or other vehicle for towing the trailer;
an axle assembly located at a rear end of the trailer and connected to the first and second main beams, said axle assembly comprising at least one left rotatable wheel and tire assembly and at least one right rotatable wheel and tire assembly for movably supporting the trailer on a surface;
wherein each of said left and right side rails comprise a one-piece aluminum extrusion comprising:
an upper portion including a platform engaging portion engaged with the cargo platform;
a lower portion comprising a winch track adapted to be slidably engaged by an associated cargo strap winch;
said lower portion further comprising a hook engagement wall that projects away from the side rail toward the first and second main beams of the trailer, said hook engagement wall comprising an upper surface oriented toward the cargo supporting platform and an opposite lower surface oriented away from the cargo supporting platform;
said hook engagement wall including a tapered nose comprising first and second nose walls that define a nose angle X such that said tapered nose is adapted to be received in an open recess of an associated cargo strap hook that defines a hook recess angle X', wherein said nose angle X is in the range of 10°-30° such that 10°≤X≤30°.

10. The trailer as set forth in claim 9, wherein said first and second nose walls comprise respective planar surfaces that converge toward each other as they extend toward said first and second main beams of said trailer.

11. The trailer as set forth in claim 9, wherein said second nose wall comprises an axially extending relief groove defined therein and adapted to accommodate a part of the associated cargo strap hook or part of an associated chain or strap connected to the associated cargo strap hook.

12. The trailer as set forth in claim 9, wherein said winch track comprises a double-L winch track comprising first and second ribs, wherein each of said first and second ribs comprises a first leg and a second leg connected to an outer end of said first leg and oriented perpendicularly relative to said first leg.

13. A trailer comprising:
- first and second main beams that extend parallel to a longitudinal axis;
- a left side rail that extends parallel to said longitudinal axis and that defines a left lateral side of said trailer;
- a right side rail that extends parallel to said longitudinal axis and that defines a right lateral side of said trailer;
- a cargo platform that extends between said left side rail and said right side rail;
- a kingpin located at a forward end of the trailer and adapted to be engaged by a fifth-wheel of an associated tractor or other vehicle for towing the trailer;
- an axle assembly located at a rear end of the trailer and connected to the first and second main beams, said axle assembly comprising at least one left rotatable wheel and tire assembly and at least one right rotatable wheel and tire assembly for movably supporting the trailer on a surface;
- wherein each of said left and right side rails comprise a one-piece aluminum extrusion comprising:
- an upper portion including a platform engaging portion engaged with the cargo platform;
- a lower portion comprising a winch track adapted to be slidably engaged by an associated cargo strap winch;
- said lower portion further comprising a hook engagement wall that projects away from the side rail toward the first and second main beams of the trailer, said hook engagement wall comprising an upper surface oriented toward the cargo supporting platform and an opposite lower surface oriented away from the cargo supporting platform;
- said hook engagement wall including a tapered nose comprising first and second nose walls that define a nose angle X such that said tapered nose is adapted to be received in an open recess of an associated cargo strap hook that defines a hook recess angle X', wherein said first nose wall comprises a planar surface that is connected to said upper surface of said hook engagement wall and is angled relative to said upper surface of said hook engagement wall at said nose angle X.

14. The trailer as set forth in claim 13, wherein said winch track comprises a double L winch track including first and second ribs each comprising a first leg and a second leg connected to and arranged perpendicular to said first leg, wherein said second leg extends from said first leg in a direction oriented away from said first and second main beams of said trailer.

* * * * *